United States Patent
Tsirkin et al.

(10) Patent No.: US 10,545,851 B2
(45) Date of Patent: *Jan. 28, 2020

(54) BREAKPOINT INSERTION INTO KERNEL PAGES

(71) Applicant: Red Hat Israel, Ltd., Raanana (IL)

(72) Inventors: Michael Tsirkin, Raanana (IL); Paolo Bonzini, Milan (IT)

(73) Assignee: RED HAT ISRAEL, LTD., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,977

(22) Filed: May 24, 2018

(65) Prior Publication Data

US 2018/0267880 A1 Sep. 20, 2018

Related U.S. Application Data (63) Continuation of application No. 15/053,823, filed on Feb. 25, 2016, now Pat. No. 9,996,448.

(51) Int. Cl.
  G06F 9/44   (2018.01)
  G06F 11/36  (2006.01)

(52) U.S. Cl.
  CPC .................. *G06F 11/362* (2013.01)

(58) Field of Classification Search
  CPC ...................................... G06F 11/362
  USPC ........................................ 717/129
  See application file for complete search history.

(56) References Cited

U.S. PATENT DOCUMENTS

| | | | |
|---|---|---|---|
| 6,964,035 B2 | 11/2005 | Poynor | |
| 7,000,225 B2 | 2/2006 | Sangavarapu et al. | |
| 7,437,619 B2* | 10/2008 | McCullough | G06F 11/3466 714/45 |
| 7,571,482 B2 | 8/2009 | Polyakov et al. | |
| 7,581,220 B1 | 8/2009 | Roeck | |
| 7,584,383 B2 | 9/2009 | Hopkinson | |
| 7,823,131 B2 | 10/2010 | Gard et al. | |
| 7,996,836 B1 | 8/2011 | Mccorkendale et al. | |
| 8,024,568 B2 | 9/2011 | Rao et al. | |

(Continued)

OTHER PUBLICATIONS

"An Effective Reversible Debugger of Cross Platform Based on Virtualization"; LimingWang, Xiyang Liu, Ailong Song, Lin Xu, Tao Liu—Software Engineering Institute, Xidian University Xi'An, Shaanxi, China. 2009 International Conferences on Embedded Software and Systems.*

(Continued)

*Primary Examiner* — Francisco J Aponte
(74) *Attorney, Agent, or Firm* — Haynes and Boone LLP (57) ABSTRACT

A method includes, with a hypervisor, receiving a first request from a guest to write a first piece of data to a first memory location within a kernel code page. The method further includes determining that the first request triggers a violation based on a kernel protection mechanism, and in response to determining that the first request triggers the violation, determining that the first piece of data includes a breakpoint. The method further includes, in response to determining that the first piece of data includes the breakpoint, copying a second piece of data currently stored at the first memory location to a second memory location within non-guest writeable memory and overwriting the first memory location with the first piece of data.

21 Claims, 5 Drawing Sheets

(56) References Cited

U.S. PATENT DOCUMENTS

| | | | |
|---|---|---|---|
| 8,108,641 B2 | 1/2012 | Goss et al. | |
| 8,239,838 B2 | 8/2012 | Yim et al. | |
| 8,370,806 B2* | 2/2013 | Codrescu | G06F 9/3005 |
| | | | 714/35 |
| 8,464,254 B1 | 6/2013 | Vohra et al. | |
| 8,661,417 B2 | 2/2014 | Panchamukhi et al. | |
| 8,677,321 B2 | 3/2014 | Olsa et al. | |
| 8,713,371 B2 | 4/2014 | Williams et al. | |
| 8,789,189 B2 | 7/2014 | Capalik et al. | |
| 8,812,804 B2 | 8/2014 | Goss et al. | |
| 8,990,520 B1 | 3/2015 | Tang et al. | |
| 9,311,248 B2 | 4/2016 | Wagner | |
| 9,459,988 B2* | 10/2016 | Guan | G06F 11/3624 |
| 9,767,003 B2 | 9/2017 | Deckert et al. | |
| 9,767,004 B2* | 9/2017 | Yang | G06F 8/53 |
| 2006/0053492 A1 | 3/2006 | Wallace | |
| 2006/0282419 A1* | 12/2006 | Sen | G06F 11/3636 |
| 2007/0180333 A1* | 8/2007 | Thekkath | G06F 11/3636 |
| | | | 714/45 |
| 2008/0288808 A1* | 11/2008 | Moyer | G06F 11/3656 |
| | | | 714/2 |
| 2009/0199162 A1* | 8/2009 | Choi | G06F 9/52 |
| | | | 717/124 |
| 2009/0307532 A1* | 12/2009 | Raber | G06F 11/3644 |
| | | | 714/38.13 |
| 2011/0185417 A1 | 7/2011 | Zhou et al. | |
| 2013/0132690 A1 | 5/2013 | Epstein | |
| 2013/0297849 A1 | 11/2013 | Wagner | |
| 2013/0318398 A1 | 11/2013 | Arapov et al. | |
| 2014/0189687 A1 | 7/2014 | Jung et al. | |
| 2015/0033038 A1 | 1/2015 | Godd et al. | |
| 2015/0046908 A1 | 2/2015 | Salsamendi | |

OTHER PUBLICATIONS

Suzaski, Kuniyasu et al., "Kernel Memory Protection by an Insertable Hypervisor which has VM Introspection and Stealth Breakpoints", National Institute of Advanced Industrial Science and Technology(AIST); FFRI, Inc., Japan, http://www.slideshare.net/suzaki/international-workshop-on-security-iwsec2014, 22 pgs. (Aug. 27, 2014).

Tanda, Satoshi, "Writing a Hypervisor for Kernel Mode Code Analysis and Fun", http://standa-note.blogspot.in/2015/08/writing-hypervisor-for-kernel-mode-code.html, 7 pgs. (Aug. 8, 2015).

* cited by examiner

BREAKPOINT INSERTION INTO KERNEL PAGES

PRIORITY DATA

This application is a continuation of U.S. patent application Ser. No. 15/053,823, filed Feb. 25, 2016, and entitled "Breakpoint Insertion into Kernel Pages", the disclosure of which is hereby incorporated by reference in its entirety.

BACKGROUND

The present disclosure generally relates to computer program debugging, and more particularly to systems and methods that allow for breakpoint insertion into a protected kernel page.

Conventional tracing technology allows users to analyze the operation of computer programs. For example, users may want to read data values at various execution times to identify a state of a computer program, write data values to particular memory locations, identify functions that are called, insert breakpoints to halt operation at particular code locations, and otherwise analyze the operation of a computer program. Tracing is useful for many activities, such as debugging. Debugging is a conventional activity that is performed using tracing technology to locate bugs/issues in computer programs and repair those bugs/issues.

Tracing technology allows tracing to be performed at the kernel level. For example, breakpoint instructions and function calls may be added and removed at various locations in kernel memory to allow analysis of the operation of the kernel. Users may, for example, identify events that are triggered in the kernel at various execution times, and otherwise trace the operation of the kernel.

Other conventional technologies that are used at the kernel level include kernel protection mechanisms. Kernel protection mechanisms allow enforcement of kernel protection measures that prevent the kernel from being modified. These mechanisms are useful for thwarting at least some malware and/or otherwise helping to safeguard the integrity of the kernel.

One issue that has arisen is that these kernel protection mechanisms are not compatible with tracing technology. That is, by preventing the kernel from being modified, the kernel protection mechanisms do not allow the kernel tracing features to be implemented in the kernel. For example, the tracing technology may be unable to insert and/or remove tracing mechanisms such as breakpoints and/or other tracing function calls into the kernel. Accordingly, while the kernel protection mechanisms may be helpful in some ways, they may also counter useful features that allow users to perform beneficial activities such as debugging.

SUMMARY

According to one example, a method includes, with a hypervisor, receiving a first request from a guest to write a first piece of data to a first memory location within a executable guest memory page. The method further includes determining that the first request triggers a violation based on a kernel protection mechanism, and in response to determining that the first request triggers the violation, determining that the first piece of data includes a breakpoint. The method further includes, in response to determining that the first piece of data includes the breakpoint, copying a second piece of data currently stored at the first memory location to a second memory location within non-guest writeable memory and overwriting the first memory location with the first piece of data.

A system includes a processor and a memory comprising machine readable instructions that when executed by the processor cause the system to: execute a hypervisor to support at least one guest, receive a first request from the at least one guest, the first request being to write a first piece of data to a first memory location within a executable guest memory page, in response to detecting an Extended Page Table (EPT) violation resulting from the first request, determine that the first piece of data comprises a breakpoint, in response to determining that the first piece of data comprises the breakpoint, copy a second piece of data currently stored at the first memory location to a second memory location within hypervisor memory, with the hypervisor, overwrite the first memory location with the first piece of data, and overwrite a remainder of the first memory location with no-operation (NOP) instructions.

A non-transitory machine-readable medium having stored thereon machine-readable instructions executable to cause a machine to perform operations that include receiving a first request from a guest to write a first piece of data to a first memory location within a executable guest memory page, determining that the first request triggers a violation of a kernel protection mechanism, in response to determining that the first request triggers the violation, determining that the first piece of data includes a breakpoint, in response to determining that the first piece of data includes a breakpoint, copying a second piece of data currently stored at the first memory location to a second memory location within non-guest writable memory, overwriting the first memory location with the first piece of data, overwriting a remainder of the first memory location with no-operation (NOP) instructions, and receiving a second request from the guest to write a third piece of data to the first memory location.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, while kernel protection mechanisms may be helpful in some ways, they may also counter useful features that allow users to perform beneficial activities such as debugging. It is desirable to have a system that provides protection for the kernel but also allows for breakpoint insertions into the kernel code to allow for debugging and other operations. According to principles described herein, a guest may request support for breakpoint insertion from the hypervisor before the kernel protection mechanism is activated (e.g., at boot-up of the guest). When support for breakpoint insertion into kernel code pages is enabled, the hypervisor will handle requests to write data to the protected kernel code page as follows.

According to one example, the hypervisor detects that the guest is attempting to write data to a memory location within an executable guest memory page, such as a kernel code page. Conventionally, such an action is disallowed by the kernel protection mechanism. But, with breakpoint insertion support enabled as described herein, the hypervisor determines if the data to be written to the memory location within the kernel code page is a breakpoint instruction. If the data is not a breakpoint instruction, then the request is denied. But, if the data is in fact a breakpoint instruction, then the hypervisor first copies the data currently stored at the memory location within the kernel code page to a memory location within non-guest memory (e.g., hypervisor memory). Then, the breakpoint instruction is inserted at the memory location in the kernel code page.

To remove the breakpoint instruction, the guest attempts to write the original instruction back to the memory location within the kernel code page. Again, this conventionally causes the kernel protection mechanism to deny such an attempt. But, with breakpoint insertion support enabled, the hypervisor determines whether the data attempting to be written matches the originals instruction as stored in the non-guest memory. If the data matches, then the original instruction is written back to the memory location within the kernel code page. If, however, the data does not match, then the attempt to write data is denied.

Using principles described herein, breakpoint insertion is allowed while the protections provided by the kernel protection mechanism remain in place. Thus, the kernel protection mechanism can still perform its desired function by protecting the guest against inadvertent or malicious request overwrite portions of the kernel code pages. A developer may perform debugging operations related to the kernel to improve the functionality of the kernel and other applications. The following will describe the breakpoint insertion support in more detail.

Figure 1:
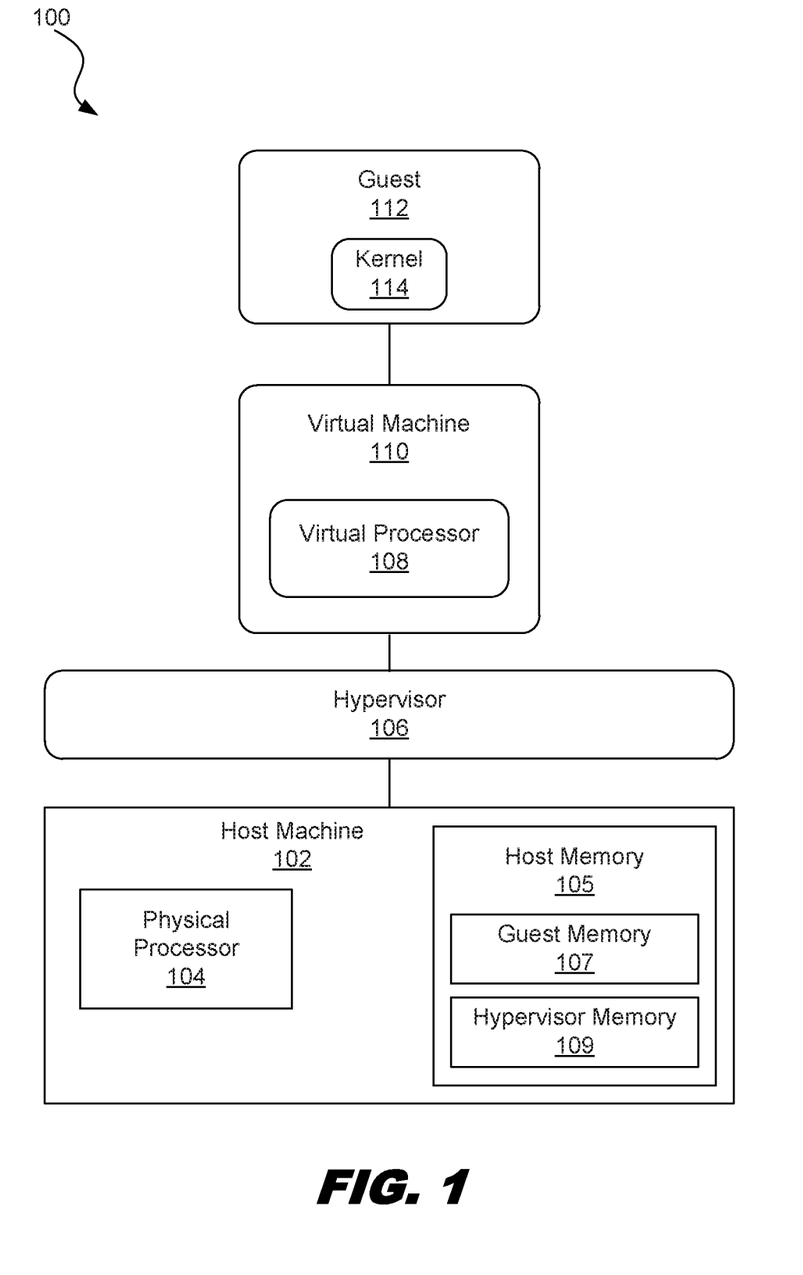
FIG. 1 is a diagram showing an illustrative host machine that is capable of supporting a guest, according to one example of principles described herein.

FIG. 1 is a diagram showing an illustrative host machine 102 that is capable of supporting a guest 112 on a virtual machine 110. While the present example illustrates a single guest 112 and virtual machine 110, the hypervisor is capable of supporting multiple virtual machines 110, each supporting a guest 112. According to the present example, a physical system, such as a host machine 102 includes hardware such as a processor 104 and a host memory 105. The system 100 also includes a hypervisor 106. The hypervisor 106 supports the virtual machine 110. The virtual machine 110 provides the guest operating system (which may also be referred to as simply a guest) 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112 may run different type of operating system than another guest 112 being run on the same host machine 102. Additionally, the operating system associated with a guest 112 running on a virtual machine 110 may be different from the host operating system running on the host machine 102.

A guest 112 may include anything executed on a virtual machine 110. For example, a guest 112 may include an operating system, applications running on that operating system, data storage associated with the applications and operating system, drivers, etc. In one example, a guest 112 may be packaged as a large set of data that is loaded into host memory 105. The hypervisor 106 then interacts with that large set of data to execute instructions on one of the virtual machines 110.

The host memory 105 refers to the working memory of the host machine 102. Working memory is typically Random Access Memory (RAM) and is designed for speed. Working memory is often a volatile form of memory, meaning that it loses its data when power is no longer supplied. The host machine 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses. The memory designated for the guests may be referred to as guest memory 107. The memory designated for the hypervisor may be referred to as hypervisor memory 109. The guest memory may be divided into different regions or modules, each module associated with a different virtual machine.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

In the present example, a kernel 114 is associated with a guest 112 and runs on the virtual machine 110 provided by the hypervisor 106. As used herein, the term "kernel" may refer to any privileged software component of an operating system. The kernel 114 provides core computing functionality to the virtual machine 110. For example, kernel 114 is structured to manage important tasks, such as allocating guest memory 107, sending and receiving I/O, managing a file system provided to the guest 112, handling interrupts, scheduling and running processes to execute instructions of computing tasks, and/or provide other fundamental computing features.

In some examples, each guest 112 is structured to include a kernel 114. In some cases, the kernel 114 may be a stand-alone kernel. However, in some examples, the virtual machine 110 is structured with the kernel 114 as well as a guest 112 that is built on top of the kernel 114 and relies upon the kernel 114 for allocating portions of the guest memory 107 to the guest 112 (and its applications) and executing instructions of the guest 112 (and its applications). The guest 112 may also be referred to as a guest operating system. Examples of guest operating systems include, for example, LINUX, UNIX, DOS, OS/2, IOS, ANDROID, WINDOWS, and so forth. These guests all include, at their core, a kernel (such as kernel 114) that handles allocation of memory and runs processes to execute instructions. The guest 112 may include features such as user interfaces (such as a desktop and/or command line interface), file systems, server applications, database management systems, tracing tools (including debugging applications), programming applications, and various other user applications that may be pre-installed on the guest 112 or added after installation of the guest 112.

The guest 112 running on a virtual machine 110 may include a same or a different operating system as a host operating system running on the host machine 102. For example, the guest 112 may provide an operating system that is accessed locally on the host machine 102 as a default operating environment of the host machine 102. In other examples, the host machine 102 is structured with an operating system that is separate from the guest 112, and the guest 112 is provided in addition to the host machine's operating system. Accordingly, the host machine 102 may run multiple operating systems concurrently and in isolation from other operating systems. Moreover, the guest operating systems of the host machine 102 and virtual machines 110 may be homogenous or heterogeneous. That is, the guest operating systems may all be one type (e.g., LINUX) or may be different types (e.g., guest 112 may be RED HAT ENTERPRISE LINUX, and a virtual machine of the virtual machine(s) may include a guest that is another type of operating system).

The hypervisor 106 provides a portion of guest memory 107 that is allocated to the kernel 114, guest 112, and/or other applications running on the virtual machine 110. In the present example, the guest memory 107 is structured as a virtualized portion of the host memory 105. The guest memory 107 may include one or more guest memory pages that are mapped to memory pages of the host memory 105 via one or more mappings, such as page tables. The mapping(s) may be provided by the hypervisor 106. As an example, page tables may include Extended Page Tables (EPT). Accordingly, the hypervisor 106 is structured with access to the guest memory 107 to virtualize the host memory 105 and provide the guest memory 107 to the virtual machine 110. The guest memory 107, once allocated to the virtual machine 110 by the hypervisor 106, may have portions allocated by the kernel 114 to the kernel 114 itself, the guest 112, and/or other applications run on the virtual machine 110 by the kernel 114.

In the present example, the kernel 114 is structured to operate in a protected kernel environment, which may prevent at least some modifications to the kernel 114. For example, the kernel 114 may be structured to include a kernel protection mechanism such as KERNEL GUARD TECHNOLOGY (KGT), which renders the memory pages and/or page table entries corresponding to the kernel 114 immutable in the virtual environment provided by the virtual machine 110. That is, the kernel 114, guest 112, and/or other applications running on the virtual machine 110 may be prevented from modifying the memory pages and/or page table entries that correspond to the kernel 114. Accordingly, without breakpoint insertion support as described herein, the guest 112 is prevented from inserting and/or removing instructions into the kernel 114 to perform tracing activities (including debugging) once the kernel protection mechanism is activated.

In the present example, the kernel protection feature prevents modification of the kernel by the kernel itself and/or any tasks that are managed by the kernel. For example, the kernel, operating system running on top of the kernel, and/or other applications that are assigned tasks managed by the kernel are prevented from writing to the kernel. In some examples, kernel protection feature prevents writes from being executed that modify (1) memory pages that are allocated to the kernel and/or (2) page mappings (such as page table entries) that correspond to the memory pages that are allocated to the kernel.

In some examples, the kernel protection feature may protect the kernel from modification by parsing each instruction that is provided to the kernel for execution, and skipping execution of instructions that would write to memory pages allocated to the kernel and/or page table entries corresponding to the memory pages. Accordingly, because the kernel, guest, and/or other applications run by the guest rely upon the kernel to manage tasks for executing instructions, the kernel is able to determine whether the instructions are write instructions and whether the destinations of the write instructions correspond to the kernel. Thus, the kernel may provide a protected kernel environment that renders the kernel's memory pages (and its page mappings) immutable to itself and/or other programs managed by the kernel.

In the present example, the hypervisor 106 is structured with access to the guest memory 107, including page table entries and memory pages allocated to the kernel 114. The hypervisor 106 maintains this access even while the protected kernel environment is implemented. The hypervisor 106 is structured to communicate with the kernel 114, such as via hypercalls, system calls, shared memory, and/or interrupts, such that information may be passed between the hypervisor 106 and the kernel 114.

Figure 2A:
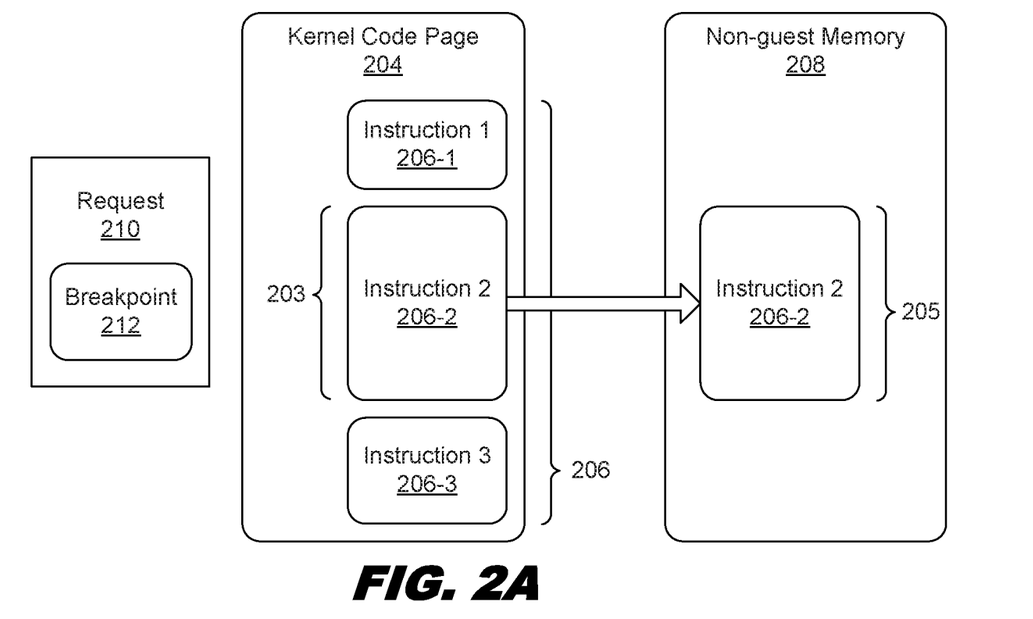
FIGS. 2A and 2B are diagrams showing an illustrative process for inserting a breakpoint into a kernel code page, according to one example of principles described herein.
Figure 2B:
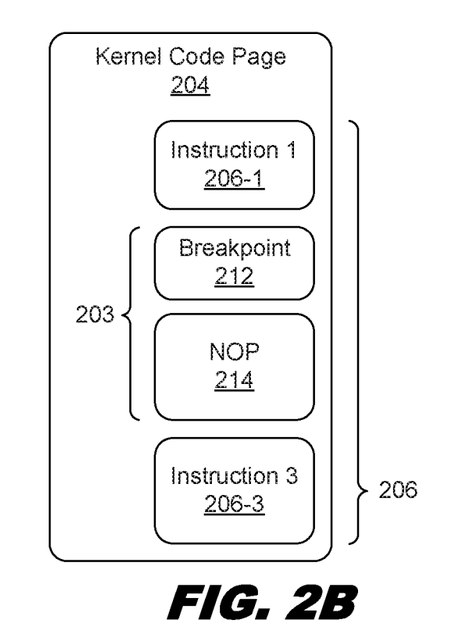

FIGS. 2A and 2B are diagrams showing an illustrative process for inserting a breakpoint into a kernel code page. As will be described in further detail below, support for inserting breakpoints may be enabled at guest boot-up before the kernel protection mechanism is activated. If breakpoint insertion support is enabled, the hypervisor may allow certain operations to overwrite data in the kernel code pages as long as those operations meet certain criteria.

FIG. 2A illustrates a process for copying an original instruction 206-2 stored in the kernel code page 204 to memory location 205 within non-guest memory 208. According to the present example, the hypervisor (e.g., 206, FIG. 1) receives a request 210 from the guest (e.g., 212, FIG. 1). The request 210 includes an instruction to write a breakpoint 212 into a memory location 203 within the kernel code page 204. The kernel code page 204 includes a number of instructions 206. Specifically, the kernel code page 204 includes instruction 1 206-1, instruction 2 206-2, and instruction 3 206-3. The request 210 is to replace instruction to 206-2 with a breakpoint 212. After confirming that such an operation is allowed, the hypervisor copies instruction 2 206-2 to the memory location 205 within non-guest memory 208. In one example, non-guest memory 208 corresponds to hypervisor memory (e.g., 109, FIG. 1).

FIG. 2B illustrates a process for adding no-operation (NOP) instructions to the kernel code page 204. In some cases, the breakpoint 212 will be smaller in size than the original instruction 206-2. In such case, the remaining space within the memory location 203 within the kernel code page 204 is filled with NOP instructions 214. Such instructions tell the processor that is executing the code to do nothing.

Figure 3A:
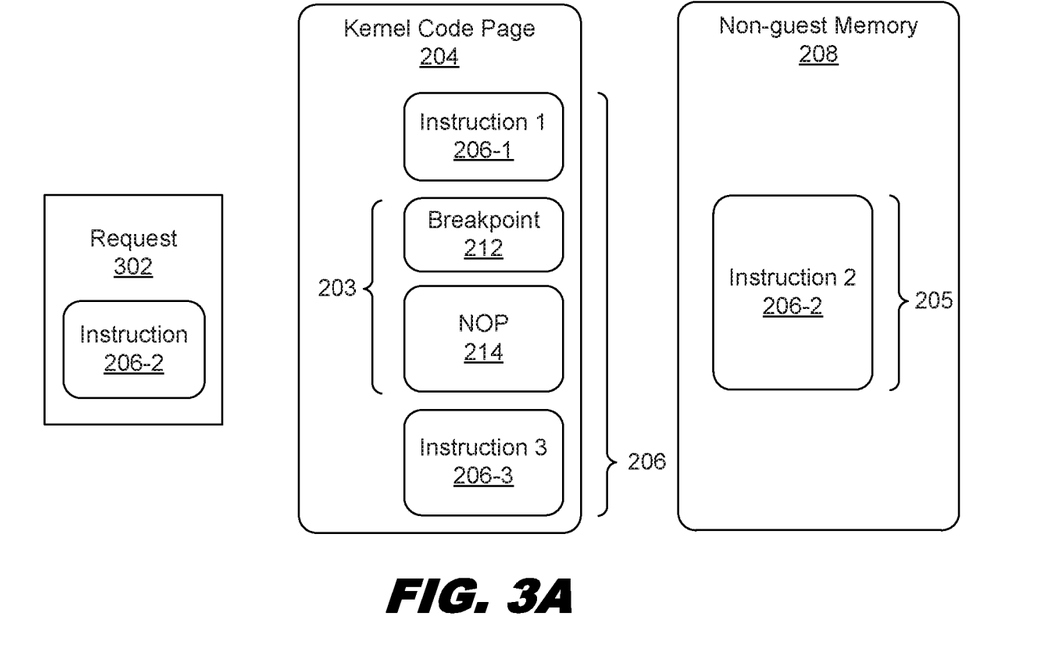
FIGS. 3A and 3B are diagrams showing an illustrative process for removing a breakpoint into a kernel code page, according to one example of principles described herein.
Figure 3B:
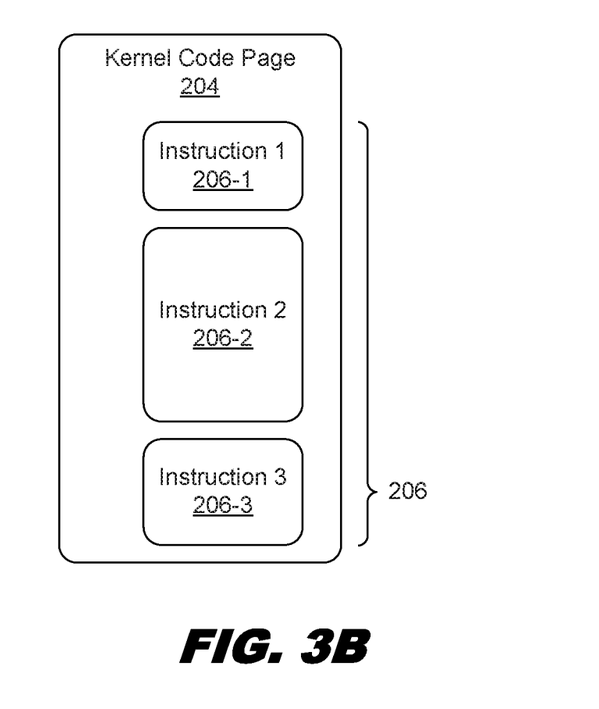

FIGS. 3A and 3B are diagrams showing an illustrative process for removing a breakpoint into a kernel code page. FIG. 3A illustrates a request 302 from the guest to the hypervisor to write the original instruction 206-2 back into the memory location 203. To confirm whether such operation is allowed, the hypervisor determines whether the instruction 206-2 matches the instruction stored within the memory location 205 of non-guest memory 208. If the instruction 206-2 matches the data in memory location 205, then the instruction 206-2 is written back to its original position as shown in FIG. 3B.

Figure 4:
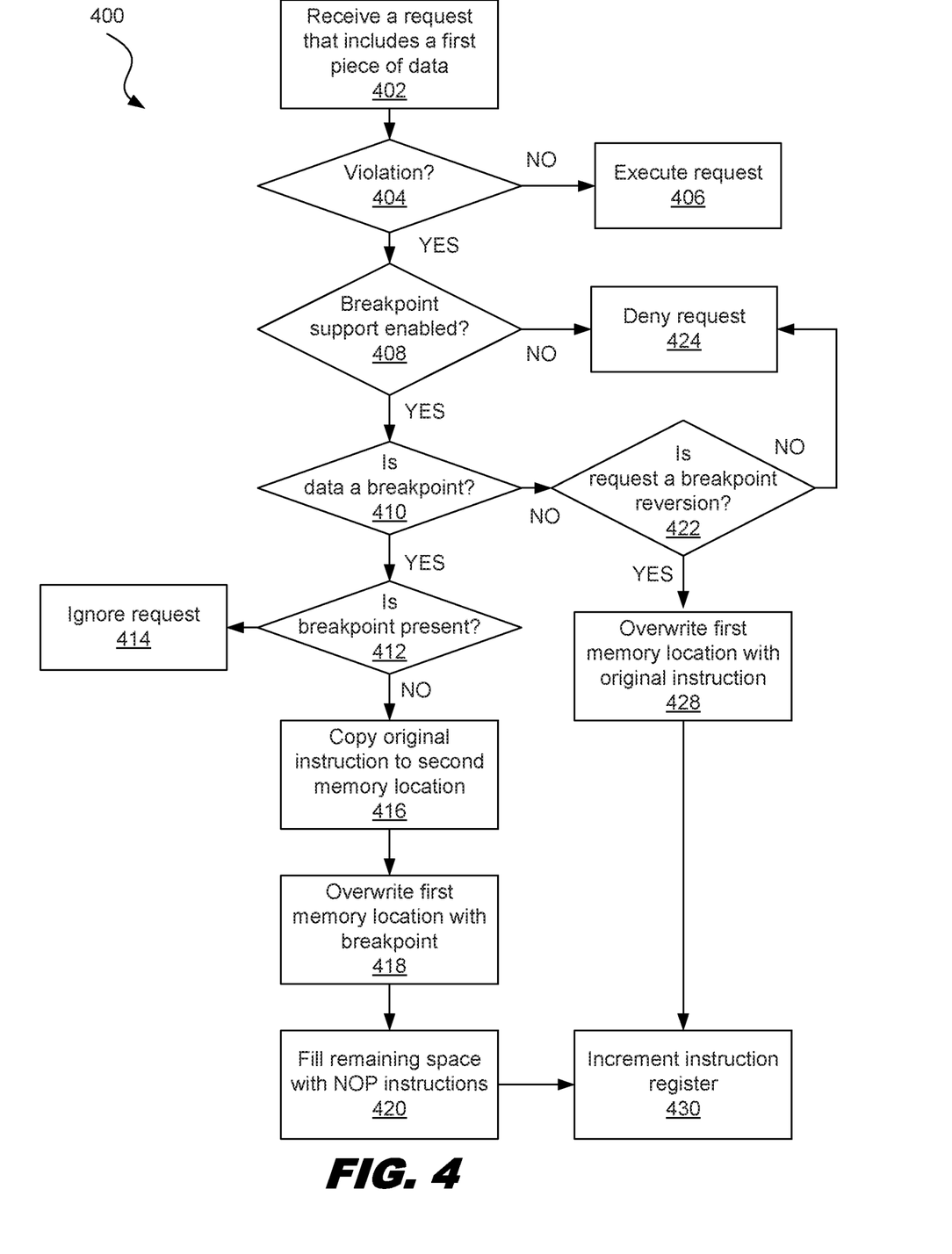
FIG. 4 is a flowchart showing an illustrative method for handling breakpoints for kernel code pages, according to one example of principles described herein.

FIG. 4 is a flowchart showing illustrative method 400 for handling breakpoints for kernel code pages. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method 400 is performed by the system 100 illustrated in FIG. 1. For example, the method 400 may be performed on the host machine 102. In some examples, the order of the actions described below may also be performed according to alternative orderings. In yet other examples, additional actions may be added and actions that are described may be removed.

At action 402, the hypervisor (e.g., 106, FIG. 1) receives a request (e.g., 210, FIG. 2A) from the guest (e.g., 112, FIG. 1) to write a first piece of data (e.g., 212, FIG. 2A) to a memory location (e.g., 203, FIG. 2A) that is within the kernel code page (e.g. 204, FIG. 2A). The request may originate from an application running on the guest. For example, the application may be attempting to insert instructions into a memory page allocated to the kernel. In another example, the application may be attempting to remove and/or change instructions that are included in a memory page that is allocated to the kernel. In yet another example, the application may be attempting to modify a page entry that is mapped to a memory page that is allocated to the kernel. The application may be, for example, the kernel itself, a guest operating system executing on the kernel, a tracing application (including a debugger), and/or other application running on top of the kernel and/or guest operating system. As described above, such an action conventionally is prevented by the kernel protection mechanism. But, according to principles described herein, such an action may be allowed if certain conditions are present.

At action 404, the hypervisor determines whether the request of action 402 triggers a page table violation. Specifically, if the first memory location is not within a protected page, then the method 400 proceeds to action 406 at which the request is executed as normal. If, however, the first memory location is within a protected page (e.g., a kernel code page), then a page table violation is triggered. For example, the violation may trigger an error handler at the hypervisor, which executes instructions to respond to the error. For example, the kernel may trigger an interrupt that is received by the hypervisor and processed at the error handler. Accordingly, the hypervisor detects the attempted modification to the kernel. The method 400 then proceeds to action 408.

At action 408 it is determined with a breakpoint insertion support has been enabled. In one example, breakpoint insertion support may be enabled upon boot-up of the guest before the kernel protection mechanism is activated. For example, as the guest is booting up, it may request breakpoint insertion support from the hypervisor. In some examples, the guest may define a range of memory addresses within the kernel code pages for which the guest desires breakpoint insertion support. In such a case, the hypervisor will also determine whether the first portion of memory from the request of action 402 is within such a range of memory addresses. If breakpoint insertion support is not enabled, or if the first portion of memory is outside a range of memory addresses that has been approved for breakpoint insertion support, then the request is denied at action 424. If, however, breakpoint support is enabled and the first portion of memory is within the approved range of memory addresses, then the method 400 proceeds to action 410. In some cases, the hypervisor may not know whether a particular page is a kernel page. Thus, the hypervisor can make decisions based on the range of memory addresses provided by the guest.

At action 410, the hypervisor determines whether the first piece of data is a breakpoint. Determining whether the first piece of data is a breakpoint may be done in a variety of manners. In one example, the hypervisor compares the first piece of data to a predetermined value. That predetermined value may correspond to a breakpoint instruction. In some examples, the hypervisor compares the first piece of data to a value received along with the request for breakpoint insertion support. In other words, when the guest requests breakpoint insertion support at start-up, the guest may provide a set of values that correspond to breakpoints that the guest may wish to use. If the hypervisor determines that the first piece of data matches such values, then it is determined that the first piece of data is a breakpoint. If, however, the first piece of data does not match such values, then it is determined that the first piece of data is not a breakpoint.

If it is determined, at action 410, that the first piece of data is a breakpoint, then the method 400 proceeds to action 412. At action 412, the hypervisor determines whether a breakpoint is already present at the first memory location. If a breakpoint is already present, then the hypervisor simply ignores the request at action 414. If, however, there is no breakpoint present, then the method 400 proceeds to action 416.

At action 416, the hypervisor copies the original instruction (e.g., 206-2, FIG. 2A) that is currently stored in the first memory location to a second memory location (e.g., 205, FIG. 2A). The second memory location is within non-guest writable memory (e.g., 208, FIG. 2A). In other words, the second memory location is a memory location for which the guest has no access privileges. For example, the second memory location may be within hypervisor memory.

At action 418, after the original instruction has been copied to the second memory location, the hypervisor overwrites the first memory location with the first piece of data of the request. In other words, the hypervisor overwrites the first memory location with the breakpoint. In some examples, the breakpoint instruction may be smaller than the original instruction stored at the first memory location. In such a case, the hypervisor may fill the remaining space with NOP instructions action 420. Then, the method 400 proceeds as the instruction register is incremented at action 430.

If it is determined, at action 410, that the first piece of data is not a breakpoint, then the method 400 proceeds to action 422. At action 422 it is determined whether the request is a breakpoint reversion. A breakpoint reversion is a request to replace the breakpoint instruction with the original instruction that was stored at the first memory location before breakpoint was inserted there. The hypervisor may determine whether the request is a breakpoint reversion by comparing the first piece of data to data stored at a second memory location in non-guest writable memory. In one example, the comparison may be done by comparing a first byte of the first piece of data with a first byte of the data stored at the second memory location. If, during a previous iteration of method 400, the first piece of data was a breakpoint, the original instruction would have been copied to the second memory location as in action 416. Thus, during a subsequent iteration of method 400 for the first piece of data is a breakpoint reversion (e.g., 302, FIG. 3A), the hypervisor can validate that breakpoint reversion by comparing the first piece of data with the data stored in the second memory location.

If the hypervisor determines that the request is not a breakpoint reversion, then the method proceeds to action 424 and the request is denied. In some examples, the denied request may be logged as well. If, however, the hypervisor determines that the request is a breakpoint reversion, then at action 428, the hypervisor overwrites the breakpoint stored at the first memory location with the original instruction associated with the request. This may include overwriting the NOP instructions as well. Then, the method 400 proceeds as the instruction register is incremented at action 430.

Figure 5:
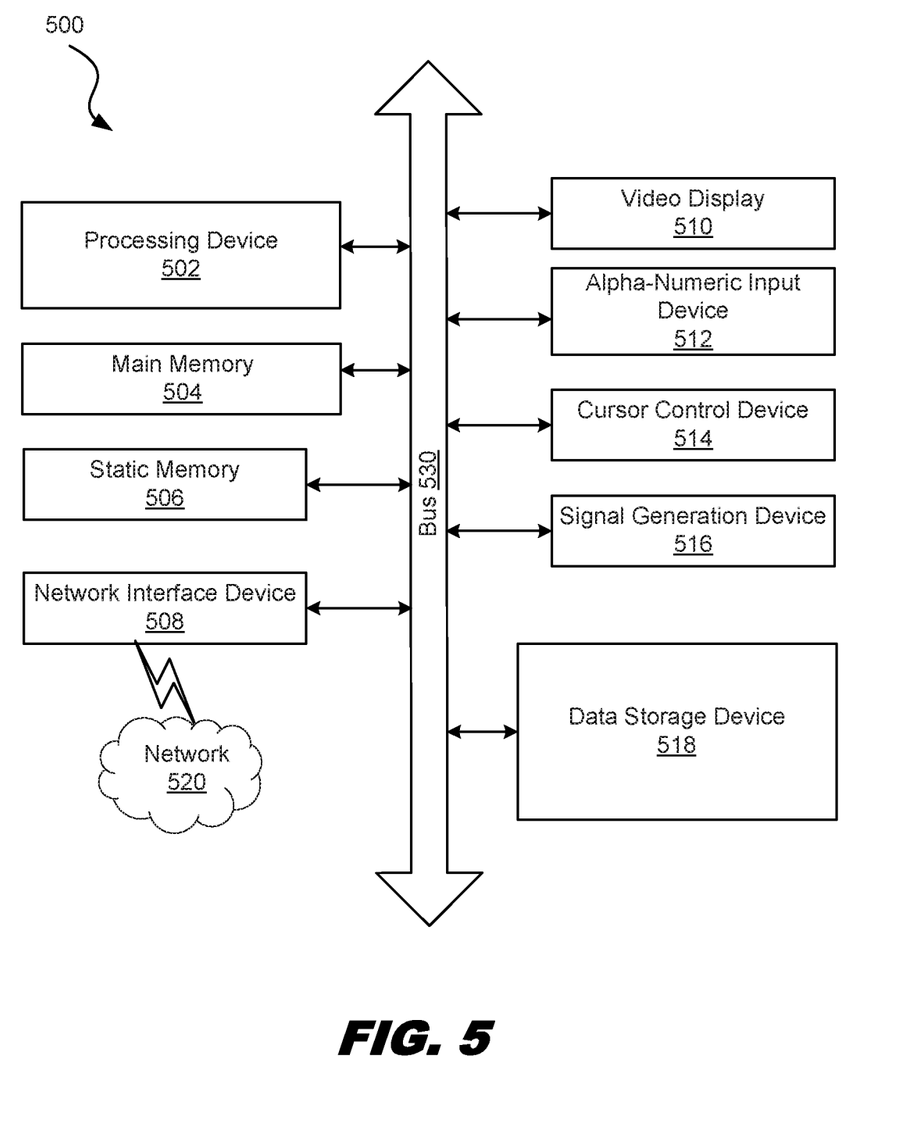
FIG. 5 is a diagram showing an illustrative computing system that may provide for breakpoint insertion into kernel code pages, according to one example of principles described herein.

FIG. 5 is a diagram showing illustrative computing system 500 that may provide for breakpoint insertion into kernel code pages. In the computer system 500, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may be used to implement one or more embodiments of the present disclosure. For example, with respect to FIG. 1, the computer system 500 may provide host hardware that executes computer-readable instructions to provide a hypervisor 106 and virtual machine 110.

Computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508 that is structured to transmit data to and from the network 520.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

The network 520 may include any combination of public and/or private networks. The network 520 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "transmitting," "comparing," "matching," "ordering," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   with a hypervisor, receiving a request from a guest to write a piece of data to a memory location within an executable guest memory page, wherein the executable guest memory page is protected using a kernel protection mechanism;
   with the hypervisor, determining that the piece of data includes a breakpoint;
   with the hypervisor, in response to determining that the piece of data includes the breakpoint, overwriting the memory location with the piece of data;
   before the kernel protection mechanism is activated, receiving from the guest a request for breakpoint insertion support; and
   with the hypervisor, denying the request in response to determining that the request does not include a breakpoint reversion, the determining including comparing the piece of data to data stored in a second memory location, wherein the denying includes logging the denied request.

2. The method of claim 1, wherein the request from the guest originates from an application running on the guest.

3. The method of claim 2, wherein the application is a tracing application.

4. The method of claim 1, wherein breakpoint insertion support is enabled upon boot-up of the guest.

5. The method of claim 1, further comprising, determining whether a breakpoint is already present in the memory location.

6. The method of claim 5, further comprising, in response to determining that the memory location contains a breakpoint, ignoring the request from the guest.

7. A system comprising:
   a processor; and
   a memory comprising machine readable instructions that when executed by the processor cause the system to:
   execute a hypervisor to support at least one guest;
   with the hypervisor, receive a request from the at least one guest, the request being to write a piece of data to a memory location within an executable guest memory page, wherein the executable memory page is protected using a kernel protection mechanism;
   with the hypervisor, deny the request in response to determining that the request does not include a breakpoint reversion, the determining including comparing the piece of data to data stored in a second memory location, wherein the denying includes logging the denied request;
   with the hypervisor, making an additional determination that the piece of data comprises a break-point;
   with the hypervisor, in response to determining that the piece of data comprises the breakpoint, overwrite the memory location with the piece of data; and
   with the hypervisor, overwrite a remainder of the memory location with no-operation (NOP) instructions.

8. The system of claim 7, wherein the request from the guest originates from an application running on the guest.

9. The system of claim 8, wherein the application is a tracing application.

10. The system of claim 7, further comprising, enabling breakpoint insertion support upon boot-up of the guest.

11. The system of claim 7, further comprising, determining whether a breakpoint is already present in the memory location.

12. The system of claim 11, further comprising, in response to determining that the memory location contains a breakpoint, ignoring the request from the guest.

13. A non-transitory machine-readable medium having stored thereon machine-readable instructions executable to cause a machine to perform operations comprising:
receiving a request from a guest to write a first piece of data to a first memory location within an executable guest memory page, wherein the executable guest memory page is protected using a kernel protection mechanism;
determining that the first piece of data includes a breakpoint;
in response to determining that the first piece of data includes a breakpoint, overwriting the first memory location with the first piece of data;
overwriting a remainder of the first memory location with no-operation (NOP) instructions;
receiving a second request from the guest to write a third piece of data to the first memory location; and
denying the second request in response to determining that the second request does not include a breakpoint reversion, the determining including comparing the third piece of data to data stored in a second memory location, wherein the denying includes logging the denied request.

14. The non-transitory machine-readable medium of claim 13, wherein the request from the guest originates from a tracing application running on the guest.

15. The non-transitory machine-readable medium of claim 13, further comprising, enabling breakpoint insertion support upon boot-up of the guest.

16. The non-transitory machine-readable medium of claim 13, further comprising, determining whether a breakpoint is already present in the memory location.

17. The non-transitory machine-readable medium of claim 16, further comprising, in response to determining that the memory location contains a breakpoint, ignoring the request from the guest.

18. A method comprising:
with a hypervisor, enabling breakpoint insertion support for an executable guest memory page, wherein the support is enabled during boot-up of a guest;
with the hypervisor, receiving a request from the guest to write a first piece of data to a first memory location within the executable guest memory page, wherein the executable guest memory page is protected using a kernel protection mechanism;
with the hypervisor, determining that the first piece of data includes a breakpoint;
with the hypervisor, in response to determining that the first piece of data includes the breakpoint, overwriting the first memory location with the first piece of data;
with the hypervisor, receiving a second request from the guest to write a third piece of data to the first memory location; and
with the hypervisor, denying the second request in response to determining that the second request does not include a breakpoint reversion, the determining including comparing the third piece of data to data stored in a second memory location, wherein the denying includes logging the denied request.

19. The method of claim 18, wherein the kernel protection mechanism renders immutable a plurality of memory pages corresponding to a kernel in a virtual environment provided by a virtual machine.

20. The method of claim 18, further comprising, determining whether a breakpoint is already present in the memory location.

21. The method of claim 20, further comprising, in response to determining that the memory location contains a breakpoint, ignoring the request from the guest.

* * * * *